US008001230B2

(12) United States Patent  (10) Patent No.: US 8,001,230 B2
Murakami et al.  (45) Date of Patent: Aug. 16, 2011

(54) GROUP MANAGEMENT APPARATUS AND GROUP MANAGEMENT SYSTEM

(75) Inventors: Yoshihiko Murakami, Kusatsu (JP); Toshihiro Kanbara, Kusatsu (JP); Naotake Shimozu, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 36 days.

(21) Appl. No.: 12/593,635

(22) PCT Filed: Apr. 4, 2008

(86) PCT No.: PCT/JP2008/056750
§ 371 (c)(1),
(2), (4) Date: Sep. 29, 2009

(87) PCT Pub. No.: WO2008/126778
PCT Pub. Date: Oct. 23, 2008

(65) Prior Publication Data
US 2010/0064037 A1  Mar. 11, 2010

(30) Foreign Application Priority Data

Apr. 11, 2007 (JP) ................................. 2007-104103

(51) Int. Cl.
*G06F 15/16* (2006.01)
*G06F 15/173* (2006.01)
*G06F 15/177* (2006.01)

(52) U.S. Cl. .......... 709/223; 454/70; 700/276; 700/278; 62/127; 62/175

(58) Field of Classification Search ............... 454/70; 709/217–228; 62/125, 127; 700/276, 278
See application file for complete search history.

(56) References Cited

U.S. PATENT DOCUMENTS

| 6,978,627 | B2 * | 12/2005 | Masui et al. | 62/127 |
| 7,340,909 | B2 * | 3/2008 | Kwon et al. | 62/175 |
| 7,523,872 | B2 * | 4/2009 | Masui et al. | 236/94 |
| 2003/0140637 | A1 * | 7/2003 | Masui et al. | 62/127 |
| 2004/0049320 | A1 * | 3/2004 | Takai et al. | 700/278 |
| 2005/0204758 | A1 * | 9/2005 | Kwon et al. | 62/175 |
| 2006/0026972 | A1 * | 2/2006 | Masui et al. | 62/127 |
| 2008/0281472 | A1 * | 11/2008 | Podgorny et al. | 700/276 |
| 2010/0121465 | A1 * | 5/2010 | Kanbara et al. | 709/223 |

FOREIGN PATENT DOCUMENTS

| JP | 02-17348 A | 1/1990 |
| JP | 06-217379 A | 8/1994 |
| JP | 07-84638 A | 3/1995 |
| JP | 08-211923 A | 8/1996 |
| JP | 10-38661 A | 2/1998 |
| JP | 10-224352 A | 8/1998 |
| JP | 2000-276679 A | 10/2000 |
| JP | 2001-67114 A | 3/2001 |
| JP | 3079973 U | 6/2001 |
| JP | 2001-306134 A | 11/2001 |
| JP | 2002-010302 A | 1/2002 |
| JP | 2004-062289 A | 2/2004 |

* cited by examiner

*Primary Examiner* — Haresh N Patel
(74) *Attorney, Agent, or Firm* — Global IP Counselors

(57) ABSTRACT

A first management apparatus that is connected to a first equipment device group including a plurality of first equipment devices centrally manages the first equipment devices. A second management apparatus connected to a second equipment device group including a plurality of second equipment devices separate from the plurality of first equipment devices centrally manages the second equipment devices. A group management apparatus connected to the first and second management apparatus centrally manages the first and second equipment device groups. The first and second management apparatus include first and second management programs to centrally manage the first and second equipment devices. The group management apparatus includes a group management program for centrally managing the first and second equipment device groups.

14 Claims, 9 Drawing Sheets

GROUP MANAGEMENT APPARATUS AND GROUP MANAGEMENT SYSTEM

CROSS-REFERENCE TO RELATED APPLICATIONS

This U.S. National stage application claims priority under 35 U.S.C. §119 (a) to Japanese Patent Application No. 2007-104103 filed in Japan on Apr. 11, 2007, the entire contents of which are hereby incorporated herein by reference.

TECHNICAL FIELD

The present invention relates to a group management apparatus that centrally manages an equipment device group comprising plural equipment devices and to a group management system that uses the group management apparatus.

BACKGROUND ART

Conventionally, in a premises where numerous equipment devices are disposed, such as universities, hospitals or factories, there is employed a management system that divides the numerous equipment devices into equipment device groups comprising plural equipment devices, connects a management apparatus to each of the groups, and centrally manages the equipment devices.

In such a management system, is it necessary to verify each of the management apparatus that are connected to the equipment devices in order to comprehend operating circumstances of the equipment devices, so when the number of management apparatus increases, it is not easy to comprehend the operating circumstances of the equipment devices in all of the management apparatus. For that reason, it is conceivable to dispose a group management apparatus that is disposed with the managing function that each of the management apparatus includes and to collectively perform management of the equipment devices within the system in the group management apparatus.

SUMMARY OF THE INVENTION

Problem that the Invention is to Solve

However, as mentioned above, when the managing function that each of the management apparatus includes is disposed in a group management apparatus and management of the plural equipment devices that the management apparatus perform is directly performed in the group management apparatus, significant setting changes become necessary in the group management apparatus when there are additions to or changes in the equipment device groups that are disposed within the system.

It is an object of the present invention to provide a group management apparatus or a group management system that can collectively perform management of equipment devices within a system and can flexibly accommodate additions to or changes in an equipment device group comprising plural equipment devices.

Means for Solving the Problem

A group management system pertaining to a first aspect of the present invention comprises a first management apparatus, a second management apparatus, and a group management apparatus. The first management apparatus is connected to a first equipment device group comprising plural equipment devices and centrally manages the equipment devices that belong to the first equipment device group. The second management apparatus is connected to a second equipment device group comprising plural equipment devices separate from the plural equipment devices that the first management apparatus centrally manages and centrally manages the equipment devices that belong to the second equipment device group. The group management apparatus is connected to the first and second management apparatus and centrally manages the first and second equipment device groups. Further, the first and second management apparatus include management programs and are configured to respectively centrally manage, through the managing programs, the equipment devices belonging to the first and second equipment device groups which are respectively connected to the first and second management apparatus. The group management apparatus includes a group management program for centrally managing the first and second equipment device groups.

In the group management system pertaining to this aspect, the first management apparatus centrally manages the plural equipment devices that belong to the first equipment device group connected to the first management apparatus using the management program that the first management apparatus includes. Also, the second management apparatus centrally manages the plural equipment devices that belong to the second equipment device group connected to the second management apparatus using the management program that the second management apparatus includes. Further, the group management apparatus is connected to the first and second management apparatus and centrally manages the equipment device groups that are connected to the first and second management apparatus using the group management program that the group management apparatus includes.

Thus, the group management apparatus becomes connectable to the plural equipment devices that are installed within the system via the plural management apparatus, and management of the plural equipment device groups that are connected to the management apparatus can be collectively performed in the group management apparatus. Moreover, the group management program or the management programs are disposed in the group management apparatus and the management apparatus, so even when there are additions to or changes in the equipment device groups within the system, the group management apparatus and the management apparatus can flexibly accommodate additions to or changes in the equipment devices because it suffices for the group management apparatus and the management apparatus to perform setting changes that are necessary for management by each.

A group management system pertaining to a second aspect of the present invention comprises the group management system pertaining to the first aspect, wherein the group management apparatus further includes a group management control unit and a first display unit. The group management control unit executes the group management program and comprehends operating circumstances of the first and second equipment device groups. The first display unit displays, per group, the operating circumstances of the first and second equipment device groups that have been comprehended by the group management control unit.

In the group management system pertaining to this aspect, the group management apparatus executes the group management program, comprehends the operating circumstances of the first and second equipment device groups, and displays the results thereof per group on the first display unit.

Thus, the operating circumstances of the equipment device groups to which the plural equipment devices belong can be collectively verified in the group management apparatus, so it is not necessary to verify each of the plural management apparatus that are disposed within the system in order to verify the operating circumstances of the equipment devices, and management of the equipment devices can be performed efficiently.

A group management system pertaining to a third aspect of the present invention comprises the group management system pertaining to the first or second aspect, wherein the first display unit selectably displays predetermined portions in regard to the first and second equipment device groups that are displayed per group. Further, the group management apparatus further includes a display control unit which, when the group management apparatus receives selections by the predetermined portions, causes management screens of the management programs that manage the equipment devices that belong to the first and second equipment device groups that correspond to the predetermined portions to be displayed on the first display unit.

In the group management system pertaining to this aspect, selections are received by the predetermined portions in regard to each of the first and second equipment device groups that are displayed per group by the first display unit, whereby the display control unit causes the management screens of the management programs executed by the management apparatus to be displayed in the first display unit. Here, the management screens of the management programs display management results of the management programs and display screens that are used in operation of the management programs. Further, the predetermined portions are portions that a user arbitrarily decides, and by selecting these portions, the management screens of the management programs executed by the management apparatus that are connected to the first or second equipment device group that correspond to the portions that have been selected are displayed on the first display unit.

Consequently, the detailed status of each of the equipment devices can be verified in the group management apparatus also, so management of the equipment devices within the system can be collectively performed in the group management apparatus.

A group management system pertaining to a fourth aspect of the present invention comprises the group management system pertaining to the third aspect, wherein the display control unit causes the management screens of the management programs that have been started up in the management apparatus to be displayed in the first display unit using a web browser.

In the group management system pertaining to this aspect, the management screens of the management programs that have been started up are capable of being operated in the first display unit using a web browser, so it can be easily universally used.

A group management apparatus pertaining to a fifth aspect of the present invention is a group management apparatus that centrally manages first and second equipment device groups and comprises a group management memory unit and a group management control unit. The first equipment device group comprises plural equipment devices, and the second equipment device group comprises plural equipment devices separate from the plural equipment devices that belong to the first equipment device group. Further, the first equipment device group is connected to a first management apparatus, and the second equipment device group is connected to a second management apparatus. The first management apparatus centrally manages the equipment devices that belong to the first equipment device group using its own management program. The second management apparatus centrally manages the equipment devices that belong to the second equipment device group using its own management program. The group management memory unit stores a group management program for centrally managing the first and second equipment device groups. The group management program is a program that is different from the management programs. Further, the group management control unit executes the group management program and centrally manages the first and second equipment device groups.

In the group management apparatus pertaining to this aspect, the group management apparatus centrally manages the first and second equipment device groups by the group management program that is different from the management programs that the first and second management apparatus include.

Thus, the group management apparatus performs central management of the equipment device groups that are connected to the management apparatus via the management apparatus, whereby the group management apparatus can collectively perform management of the equipment devices within the system. Moreover, the group management program that is different from the management programs is disposed in the group management apparatus, so even when there are additions to or changes in the equipment devices within the system, the group management apparatus can flexibly accommodate additions to or changes in the equipment device groups because it suffices for the group management apparatus to perform setting changes that are necessary for management of the equipment device groups.

A group management apparatus pertaining to a sixth aspect of the present invention comprises the group management apparatus pertaining to the fifth aspect, wherein the group management control unit executes the group management program and comprehends operating circumstances of the first and second equipment device groups. Further, the group management apparatus further comprises a first display unit. The first display unit displays, per group, the operating circumstances of the first and second equipment device groups that have been comprehended by the group management control unit.

In the group management apparatus pertaining to this aspect, the group management control unit executes the group management program and comprehends the operating circumstances of the first and second equipment device groups, and the results thereof are displayed per group on the first display unit.

Thus, the operating circumstances of the equipment device groups to which the plural equipment devices belong can be collectively verified in the group management apparatus, so it is not necessary to verify each of the plural management apparatus that are disposed within the system in order to verify the operating circumstances of the equipment devices, and management of the equipment devices can be performed efficiently.

A group management apparatus pertaining to a seventh aspect of the present invention comprises the group management apparatus pertaining to the fifth or sixth aspect, wherein the first display unit selectably displays predetermined portions in regard to the first and second equipment device groups that are displayed per group. Further, the group management apparatus further includes a display control unit. When the group management apparatus receives selections by the predetermined portions, the display control unit causes management screens of the management programs that manage the equipment devices that belong to the first and second equipment device groups that correspond to the predetermined portions to be displayed on the first display unit.

In the group management apparatus pertaining to this aspect, selections are received by the predetermined portions in regard to each of the first and second equipment device groups that are displayed per group by the first display unit, whereby the display control unit causes the management screens of the management programs executed by the management apparatus to be displayed in the first display unit. Here, the management screens of the management programs display management results of the management programs and display screens that are used in operation of the management programs. Further, the predetermined portions are portions that a user arbitrarily decides, and by selecting these portions, the management screens of the management programs executed by the management apparatus that are connected to the first or second equipment device group that correspond to the portions that have been selected are displayed on the first display unit.

Consequently, the detailed status of each of the equipment devices can be verified in the group management apparatus also, so management of the equipment devices within the system can be collectively performed in the group management apparatus.

A group management apparatus pertaining to an eighth aspect of the present invention comprises the group management apparatus pertaining to the seventh aspect, wherein the display control unit causes the management screens of the management programs to be displayed in the first display unit using a web browser.

In the group management apparatus pertaining to this aspect, the management screens of the management programs that have been started up are capable of being displayed in the first display unit using a web browser, so it can be easily universally used.

Effects Of The Invention

In the group management system pertaining to the first invention, management of the plural equipment device groups that are connected to the management apparatus can be collectively controlled in the group management apparatus, and additions to or changes in the equipment device groups can be flexibly accommodated.

In the group management system pertaining to the second invention, the operating circumstances of the equipment device groups to which the plural equipment devices belong can be collectively verified in the group management apparatus, so management of the equipment devices can be efficiently performed.

In the group management system pertaining to the third invention, the details status of each of the equipment devices can also be verified in the group management apparatus, so management of the equipment devices within the system can be collectively performed.

In the group management system pertaining to the fourth invention, the management programs that have been started up are capable of being operated in the first display unit using a web browser, so it can be easily universally used.

In the group management apparatus pertaining to the fifth invention, the group management apparatus performs central management of the equipment devices that are connected to the management apparatus via the management apparatus, whereby management of the equipment devices within the system can be collectively performed, and additions to or changes in the equipment device groups can be flexibly accommodated.

In the group management apparatus pertaining to the sixth invention, the operating circumstances of the equipment device groups to which the plural equipment devices belong can be collectively verified in the group management apparatus, so it is not necessary to verify each of the plural management apparatus that are disposed within the system in order to verify the operating circumstances of the equipment devices, and management of the equipment devices can be performed efficiently.

In the group management apparatus pertaining to the seventh invention, the detailed status of each of the equipment devices can also be verified in the group management apparatus, so management of the equipment devices within the system can be collectively performed.

In the group management apparatus pertaining to the eighth invention, the management programs that have been started up are capable of being operated in the first display unit using a web browser, so it can be easily universally used.

DETAILED DESCRIPTION OF THE INVENTION

Embodiment

Below, a group management system pertaining to a first embodiment of the present invention will be described using the drawings <Overall Configuration>

Figure 1:
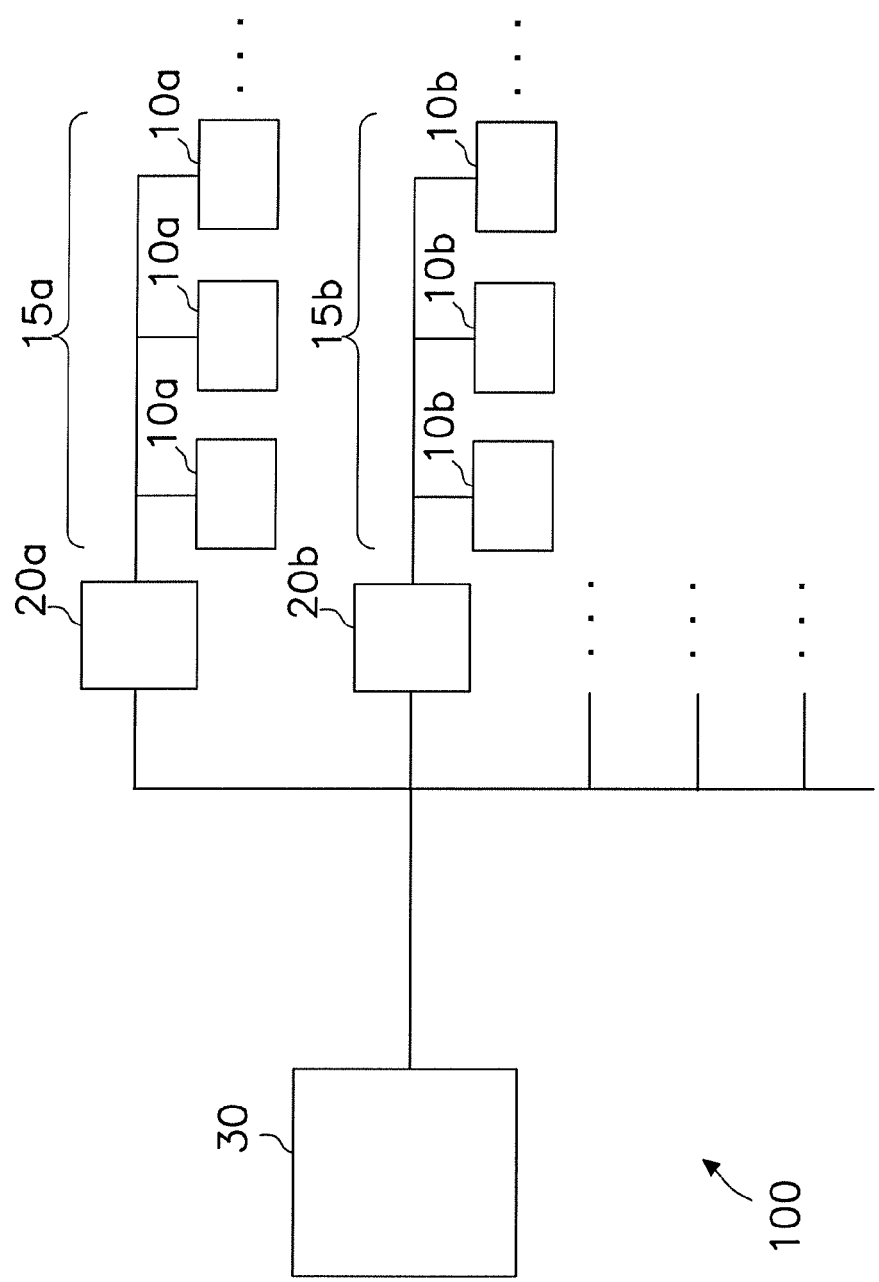
FIG. 1 is a diagram showing the overall configuration of a group management system pertaining to an embodiment of the present invention.

FIG. 1 shows the configuration of a group management system 100 pertaining to the present embodiment. The group management system 100 is a management system of air conditioners 10a, 10b, etc. that are used in universities, hospitals or factories, and the group management system 100 is disposed with plural air conditioners 10a, 10b, etc., management apparatus 20a, 20b, etc. that centrally manage the air conditioners 10a, 10b, etc., and a group management apparatus 30 that centrally manages air conditioner groups 15a, 15b, etc. comprising the plural air conditioners 10a, 10b, etc.

In this group management system 100, the air conditioners 10a, 10b, etc. are connected to the management apparatus 20a, 20b, etc. by dedicated control lines, and the group management apparatus 30 is connected to the management apparatus 20a, 20b, etc. via an intranet line. It will be noted that the numbers of the management apparatus 20a, 20b, etc., the equipment device groups 15a, 15b, etc. that are respectively connected to the management apparatus 20a, 20b, etc., and the air conditioners 10a, 10b, etc. that belong to the equipment device groups 15a, 15b, etc. are not limited to the numbers shown in FIG. 1. That is, although they are not shown in the drawing, in addition to the two management apparatus which are the management apparatus 20a and 20b, other management apparatus are respectively connected to other equipment device groups that are not the equipment device groups 15a and 15b, and other air conditioners that are not the air conditioners 10a and 10b belong to those equipment device groups.

<Configuration of Each Part>

(1) General Configuration of Air Conditioners 10a, 10b, Etc.

Figure 2:
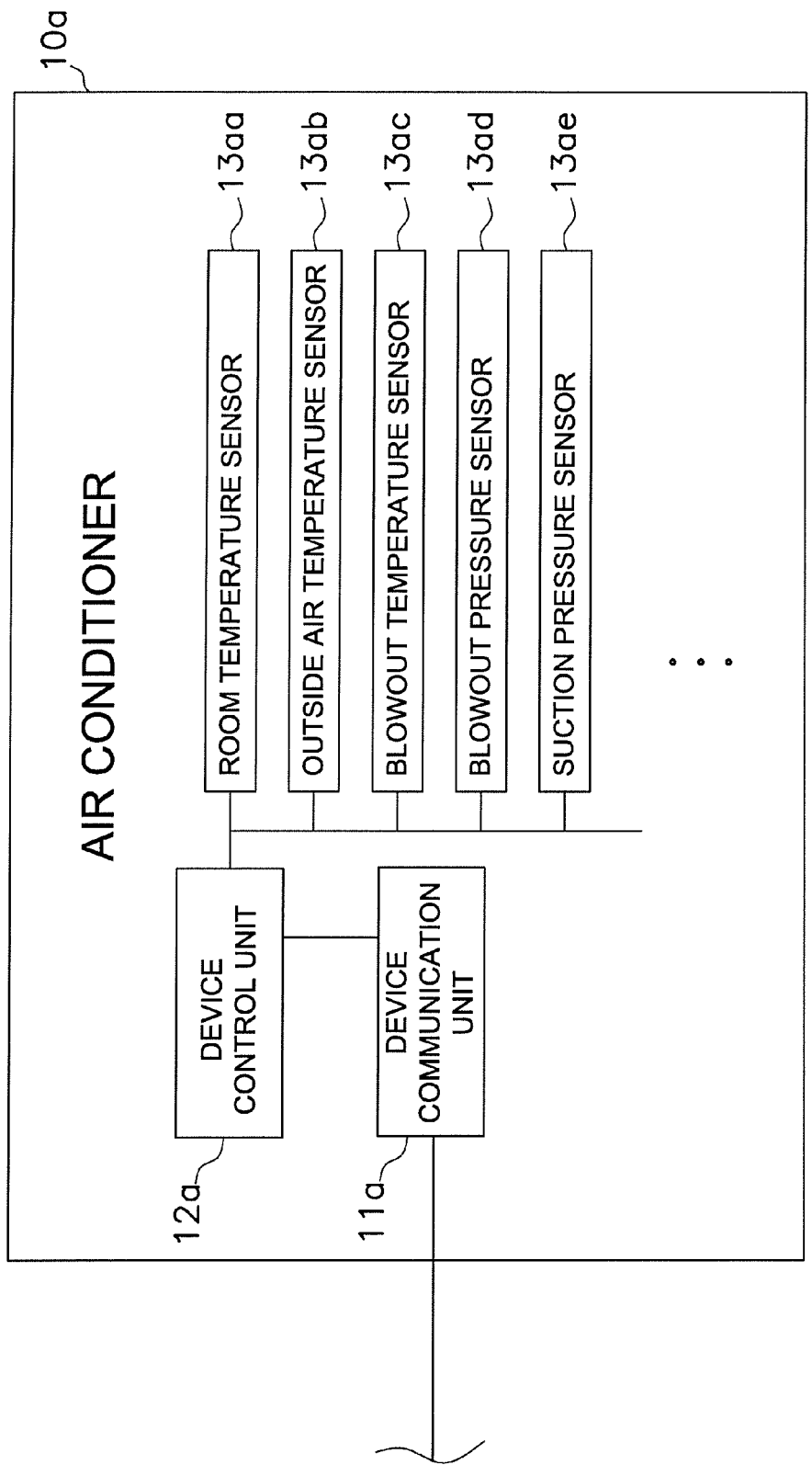
FIG. 2 is a diagram showing the configuration of an air conditioner pertaining to an embodiment of the present invention.

In this group management system 100, the plural air conditioners 10a, 10b, etc. are connected to the plural management apparatus 20a, 20b, etc. and installed in one premises such as a university, a hospital or a factory. Below, the air conditioners 10a will be described using FIG. 2, but the other air conditioners 10b are also the same.

Each of the air conditioners 10a includes an unillustrated refrigerant circuit that is configured by a compressor, a heat exchanger, and the like. Further, various types of sensors 13aa, 13ab, 13ac, 13ad, 13ae, etc. are attached to each of the air conditioners 10a. The sensor 13aa detects the temperature of the room where the air conditioner 10a is installed. The sensor 13ab detects the temperature of the outside air in the vicinity of equipment where the air conditioner 10a is installed. The sensor 13ac detects a blowout temperature that is the temperature of refrigerant in a blowout pipe of the compressor that is included in the air conditioner 10a. The sensor 13ad detects a blowout pressure that is the pressure of refrigerant in the blowout pipe of the compressor that is included in the air conditioner 10a. The sensor 13ae detects a suction pressure that is the pressure of refrigerant in a suction pipe of the compressor that is included in the air conditioner 10a.

Moreover, the air conditioner 10a includes a device communication unit 11a and a device control unit 12a. The device communication unit 11a is connected to the management apparatus 20a by a dedicated control line. The device control unit 12a controls operation of the air conditioner 10a in response to a control command that is transmitted from the outside. Further, the device control unit 12a is connected to the aforementioned various types of sensors 13aa, 13ab, 13ac, 13ad, 13ae, etc., and transmits values (device information) that have been detected by these sensors to the management apparatus 20a at a predetermined interval (in the present embodiment, one minute). Further, the device control unit 12a compares the values that have been acquired from the various types of sensors 13aa, 13ab, 13ac, 13ad, 13ae, etc. at the predetermined interval (in the present embodiment, one minute) with predetermined thresholds, and when the device control unit 12a detects an abnormality such as a value that exceeds a predetermined threshold, then the device control unit 12a also transmits abnormality information indicating that abnormality to the management apparatus 20a as device information.

(2) General Configuration of Management Apparatus 20a, 20b, Etc.

The management apparatus 20a, 20b, etc. are installed in the premises where the air conditioners 10a, 10b, etc. are disposed and centrally manage the plural air conditioners 10a, 10b, etc. via dedicated control lines. It will be noted that the management apparatus 20a, 20b, etc. are connected to the air conditioner groups 15a, 15b, etc. comprising the plural air conditioners 10a, 10b, etc. and to the later-described group management apparatus 30. Here, the air conditioner groups 15a, 15b, etc. are groups into which a system manager has divided the plural air conditioners 10a, 10b, etc., and the management apparatus 20a, 20b, etc. are connected to each group in order to make management of the air conditioners 10a, 10b, etc. easy. Below, the management apparatus 20a will be described using FIG. 3, but the other management apparatus 20b, etc. are also the same.

Figure 3:
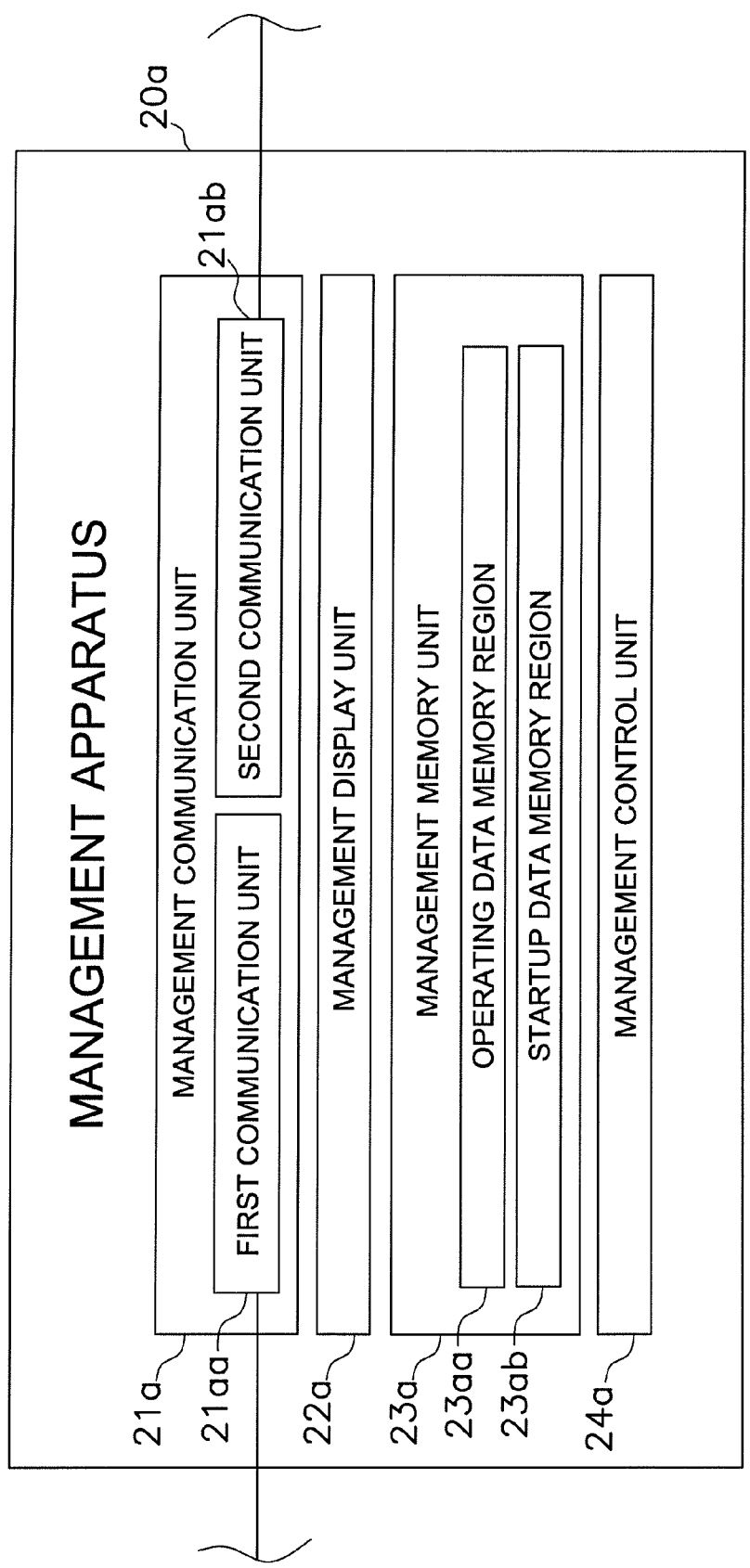
FIG. 3 is a diagram showing the configuration of a management apparatus pertaining to an embodiment of the present invention.

As shown in FIG. 3, the management apparatus 20a is mainly configured by a management communication unit 21a, a management display unit 22a, a management memory unit 23a and a management control unit 24a.

The management communication unit 21a includes a first communication unit 21aa and a second communication unit 21ab. The first communication unit 21aa receives control signals from the group management apparatus 30. The second communication unit 21ab transmits control signals to the air conditioners 10a that belong to the air conditioner group 15a that is connected to the management apparatus 20a and receives the device information from the air conditioners 10a. It will be noted that the device information is the values that have been detected by the various types of sensors 13aa, 13ab, 13ac, 13ad, 13ae, etc. that are disposed in the air conditioners 10a, information relating to abnormalities in the air conditioners 10a, and information relating to the operating circumstances of the air conditioners 10a that the later-described management control unit 24a comprehends by periodically connecting to the device control units 12a of the air conditioners 10a.

Figure 4:
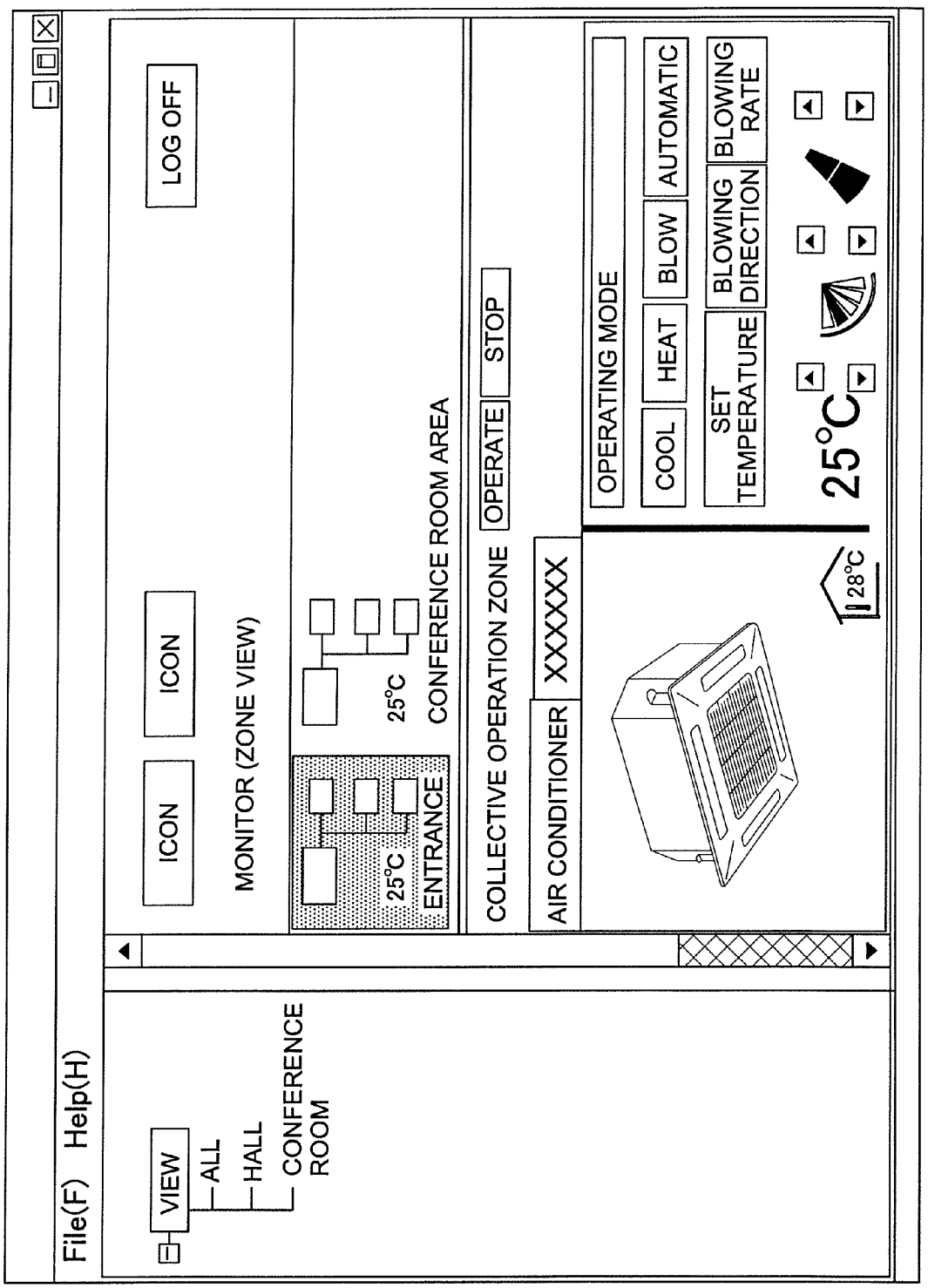
FIG. 4 is a diagram showing a management screen of a management program pertaining to an embodiment of the present invention.

The management display unit 22a displays a management screen (see FIG. 4) when a later-described management program is executed. The management screen is a screen that displays information that has been received by the management apparatus 20a and is an operation screen for receiving control of the plural air conditioners 10a by the management apparatus 20a.

An operating data memory region 23aa and a startup data memory region 23ab are reserved in the management memory unit 23a. The device information that has been received from the air conditioners 10a is accumulated in the operating data memory region 23aa. The startup data memory region 23ab is a region which, when the management apparatus 20a receives a collective startup command from the later-described group management apparatus 30, stores settings in regard to after how many seconds after command reception the air conditioners 10a that are connected to the management apparatus are to be started up. Moreover, a region that stores a management program for managing the air conditioners 10a that are connected to the management apparatus 20a is reserved in the management memory region 23a.

The management control unit 24a executes the management program stored in the management memory region 23a and centrally manages the plural air conditioners 10a that belong to the air conditioner group 15a that is connected to the management apparatus 20a. Specifically, the management control unit 24a judges at a predetermined interval whether or not there are abnormalities in the air conditioners 10*a* on the basis of the device information stored in the operating data memory region 23*aa*. Further, the management control unit 24*a* periodically connects to the device control units 12*a* with which the air conditioners 10*a* are disposed and comprehends operating circumstances of the air conditioners 10*a* (e.g., whether the air conditioners are operating or stopped). Moreover, the management control unit 24*a* performs control of operation of the plural air conditioners 10*a* (operating or stopping the air conditioners; changing operating modes, such as a cooling mode, a heating mode and an air blowing mode; changing the temperature; changing the blowing direction; changing the blowing rate, etc.).

(3) General Configuration of Group Management Apparatus 30

The group management apparatus 30 is installed in the premises where the air conditioners 10*a*, 10*b*, etc. are disposed, such as a place where a system manager or the like who performs management of the air conditioners 10*a*, 10*b*, etc. and the like stands by. Further, the group management apparatus 30 is connected to the plural management apparatus 20*a*, 20*b*, etc. and centrally manages the air conditioner groups 15*a*, 15*b*, etc. that are connected to each of the management apparatus 20*a*, 20*b*, etc.

Figure 5:
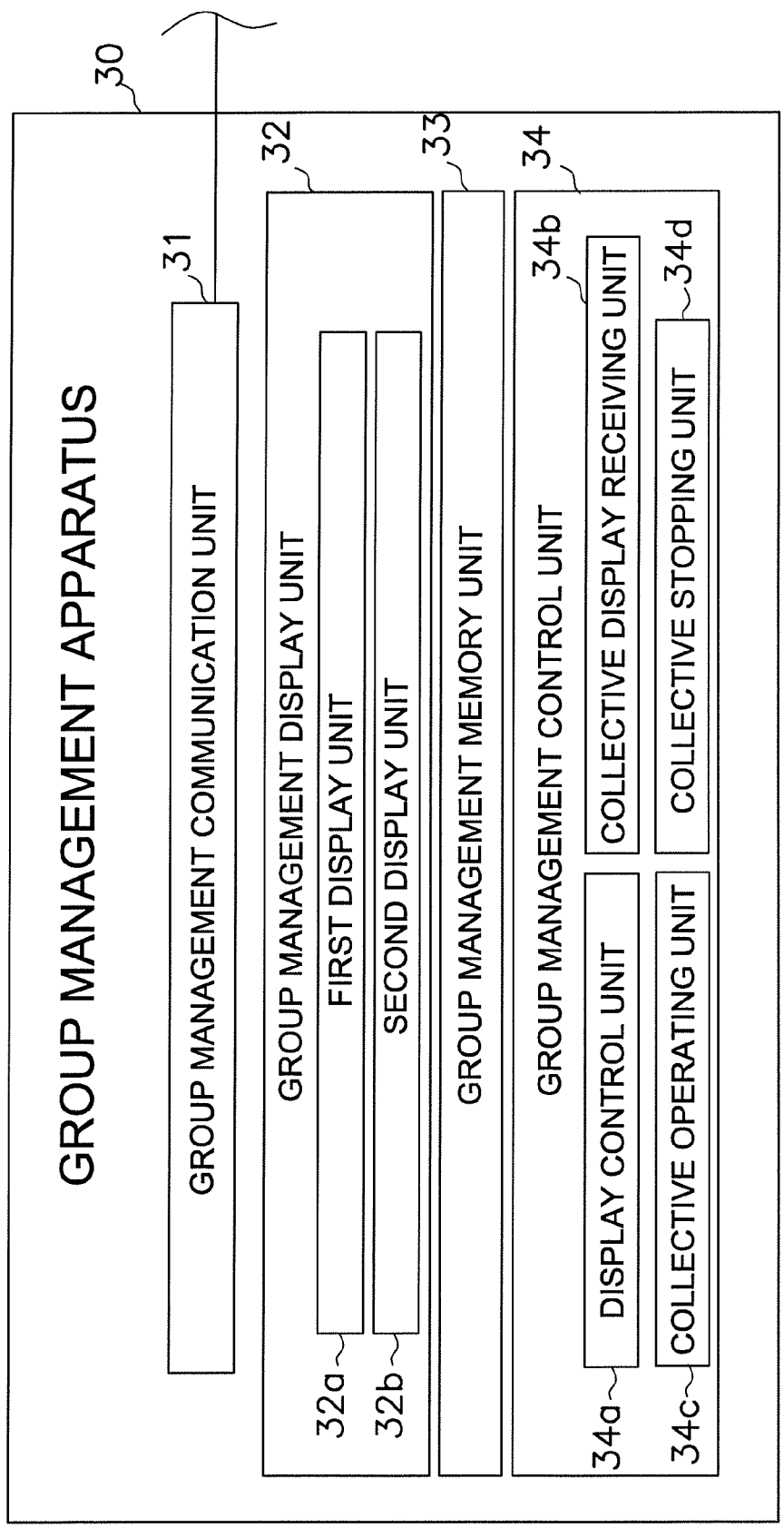
FIG. 5 is a diagram showing the configuration of a group management apparatus pertaining to an embodiment of the present invention.

As shown in FIG. 5, the group management apparatus 30 is mainly configured by a group management communication unit 31, a group management display unit 32, a group management memory unit 33 and a group management control unit 34.

The group management communication unit 31 is connected to the management communication units 21*a* via an intranet line, transmits control signals with respect to the management apparatus 20*a*, 20*b*, etc., and receives data signals from the management apparatus 20*a*, 20*b*, etc.

The group management display unit 32 is mainly configured by a first display unit 32*a* and a second display unit 32*b*. The first display unit 32*a* displays, per group, results of management of the plural air conditioner groups 15*a*, 15*b*, etc. by the later-described group management control unit 34. The second display unit 32*b* comprehensively displays results of management of the plural air conditioner groups 15*a*, 15*b*, etc. in the later-described group management control unit 34.

A region that stores a group management program for centrally managing the air conditioner groups 15*a*, 15*b*, etc. that are connected to the group management apparatus 30 is reserved in the group management memory unit 33.

The group management control unit 34 executes the aforementioned group management program stored in the group management memory unit 33 and comprehends operating circumstances of the air conditioner groups 15*a*, 15*b*, etc. Specifically, the group management control unit 34 acquires the device information of the air conditioners 10*a*, 10*b*, etc. from the operating data memory region 23*aa* of each of the management apparatus 20*a*, 20*b*, etc. and judges whether or not the air conditioners 10*a*, 10*b*, etc. are a predetermined circumstance. The predetermined circumstance is whether the air conditioners are operating or stopped and abnormal or normal. Here, when at least one of the air conditioners 10*a*, 10*b*, etc. of the air conditioners 10*a*, 10*b*, etc. is currently operating, then the air conditioner groups 15*a*, 15*b*, etc. to which the air conditioners 10*a*, 10*b*, etc. belong are displayed as currently operating in the aforementioned first display unit 32*a*, and when at least one of the air conditioners 10*a*, 10*b*, etc. is abnormal, then the air conditioners 10*a*, 10*b*, etc. are displayed as abnormal in the first display unit 32*a*. Further, when at least one group of the air conditioner groups 15*a*, 15*b*, etc. is currently operating, then the air conditioner groups 15*a*, 15*b*, etc. are displayed as currently operating in the aforementioned second display unit 32*b*, and when at least one group of the air conditioner groups 15*a*, 15*b*, etc. is abnormal, then the air conditioner groups 15*a*, 15*b*, etc. are displayed as abnormal in the second display unit 32*b*.

Figure 6:
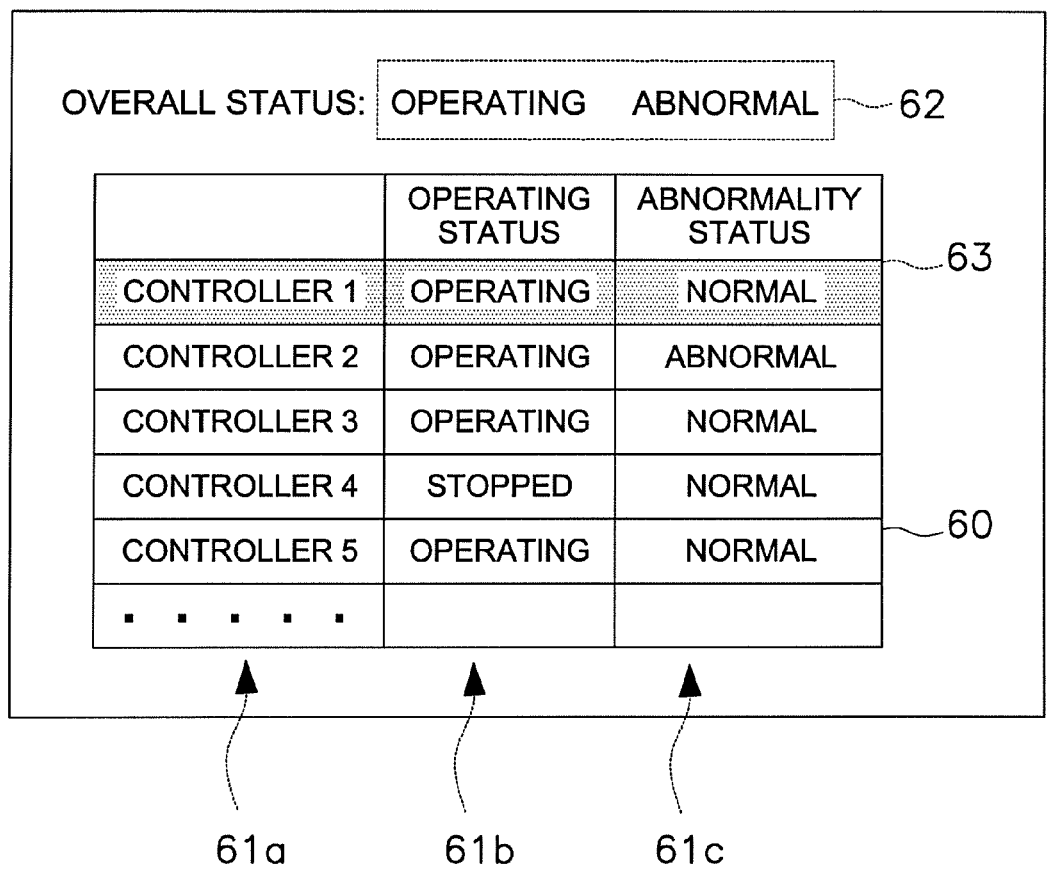
FIG. 6 is a diagram showing a management screen of a group management program pertaining to an embodiment of the present invention.

FIG. 6 will be referenced in order to describe this in greater detail. FIG. 6 is a management screen of the group management program showing management results of the group management control unit 34 that are displayed on the aforementioned group management display unit 32. Controllers that are arranged in a region 61*a* of a chart 60 represent the management apparatus 20*a*, 20*b*, etc. that are connected to the air conditioner groups 15*a*, 15*b*, etc. A region 61*b* of the chart 60 shows operating statuses of the air conditioner groups 15*a*, 15*b*, etc. (whether the air conditioner groups are operating or stopped). A region 61*c* of the chart 60 shows abnormality statuses of the air conditioner groups 15*a*, 15*b*, etc. (whether the air conditioner groups are abnormal or normal). The operating circumstances of the air conditioner groups 15*a*, 15*b*, etc. that are displayed in the region 61*b* and the region 61*c* correspond to the operating circumstances of the air conditioner groups 15*a*, 15*b*, etc. that are displayed on the first display unit 32*a*. Further, a region 62 corresponds to comprehensively displayed operating circumstance management results of the plural air conditioner groups 15*a*, 15*b*, etc. that are displayed on the aforementioned second display unit 32*b*.

In regard to the aforementioned judgment results that are displayed on the first display unit 32*a*, when it is judged that there are air conditioners 10*a*, 10*b*, etc. that are currently operating, then "operating" is displayed in the operating status column (the region 61*b*) that corresponds to the controllers of the air conditioner groups 15*a*, 15*b*, etc. to which the air conditioners 10*a*, 10*b*, etc. belong, and when all of the air conditioners 10*a*, 10*b*, etc. are stopped, then "stopped" is displayed in the column of region 61*b*. Further, when an abnormality is detected in at least one of the air conditioners 10*a*, 10*b*, etc. that belong to the air conditioner groups 15*a*, 15*b*, etc., then "abnormal" is displayed in the operating status column (the region 61*c*) that corresponds to the air conditioner groups 15*a*, 15*b*, etc. in which an abnormality of the air conditioners 10*a*, 10*b*, etc. has been detected, and when all of the air conditioners 10*a*, 10*b*, etc. are normal, then "normal" is displayed in the region 61*c*.

Figure 7:
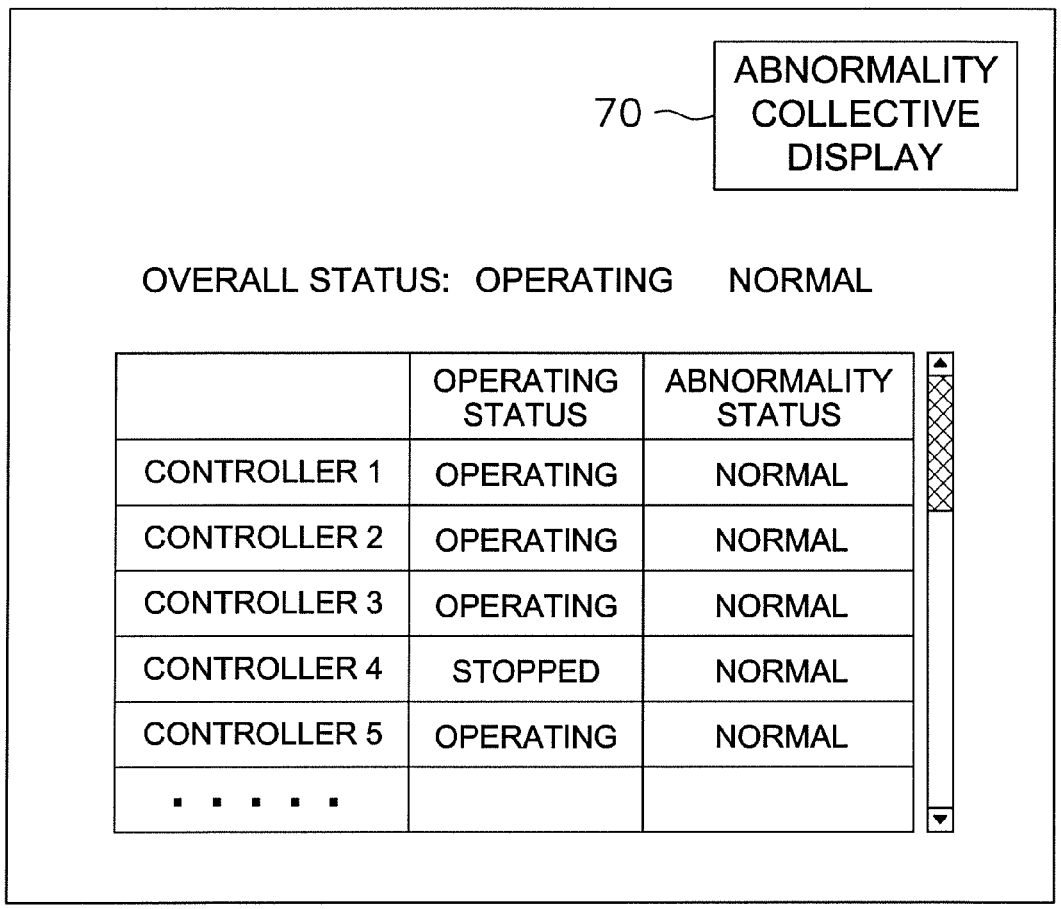
FIG. 7 is a diagram showing a management screen of a group management program pertaining to an embodiment of the present invention.

Moreover, the group management control unit 34 includes a display control unit 34*a*, a collective display receiving unit 34*b*, a collective operating unit 34*c* and a collective stopping unit 34*d*. The display control unit 34*a* is activated when it receives selections by predetermined portions of the air conditioner groups 15*a*, 15*b*, etc. that are displayed per group in the first display unit 32*a*. And that causes the management screens of the management programs that are started up in the management apparatus 20*a*, 20*b*, etc. to be displayed in the group management display unit 32. Specifically, the display control unit 34*a* receives selections by predetermined portions of the air conditioner groups 15*a*, 15*b*, etc. that are displayed per group, whereby the display control unit 34*a* displays, in the group management display unit 32, the management screens (see FIG. 4) of the management programs in the management apparatus 20*a*, 20*b*, etc. that are connected to the air conditioner groups 15*a*, 15*b*, etc. that have been selected. In the present embodiment, the predetermined portion is a portion represented by region 63 in FIG. 6. By using the management screens of the management programs that are displayed on the group management display unit 32, the group management apparatus 30 can perform control of operation of the air conditioners 10*a*, 10*b*, etc. that are connected to the management apparatus 20*a*, 20*b*, etc. via the management apparatus 20*a*, 20*b*, etc. The collective display receiving unit 34*b* causes the management screens of the management programs that have been started up in the respective management apparatus 20*a*, 20*b*, etc. to be displayed in the group management display unit 32 in regard to all of the management apparatus 20*a*, 20*b*, etc. that have been judged "abnormal" in the operating circumstances of each of the aforementioned air conditioner groups 15*a*, 15*b*, etc. It will be noted that the collective display receiving unit 34*b* is, for example, a button that is disposed on a screen that displays the management results of the group management program (see 70 in FIG. 7). Further, the management screens of the management programs that are displayed here are displayed on the group management display unit 32 of the group management apparatus 30 using a web browser. The collective operating unit 34*c* transmits control signals with respect to the management apparatus 20*a*, 20*b*, etc. so as to start operation of the air conditioners 10*a*, 10*b*, etc. that the management apparatus 20*a*, 20*b*, etc. manage. When the management apparatus 20*a*, 20*b*, etc. receive the control signals, they cause the air conditioners 10*a*, 10*b*, etc. to start up on the basis of settings that are stored in the startup data memory regions 23*ab* of the management memory units 23*a*. The collective stopping unit 34*d* transmits control signals with respect to the management apparatus 20*a*, 20*b*, etc. so as to stop operation of the air conditioners 10*a*, 10*b*, etc. that the management apparatus 20*a*, 20*b*, etc. manage.

(Flow of Control in Group Management System 100)

Figure 8:
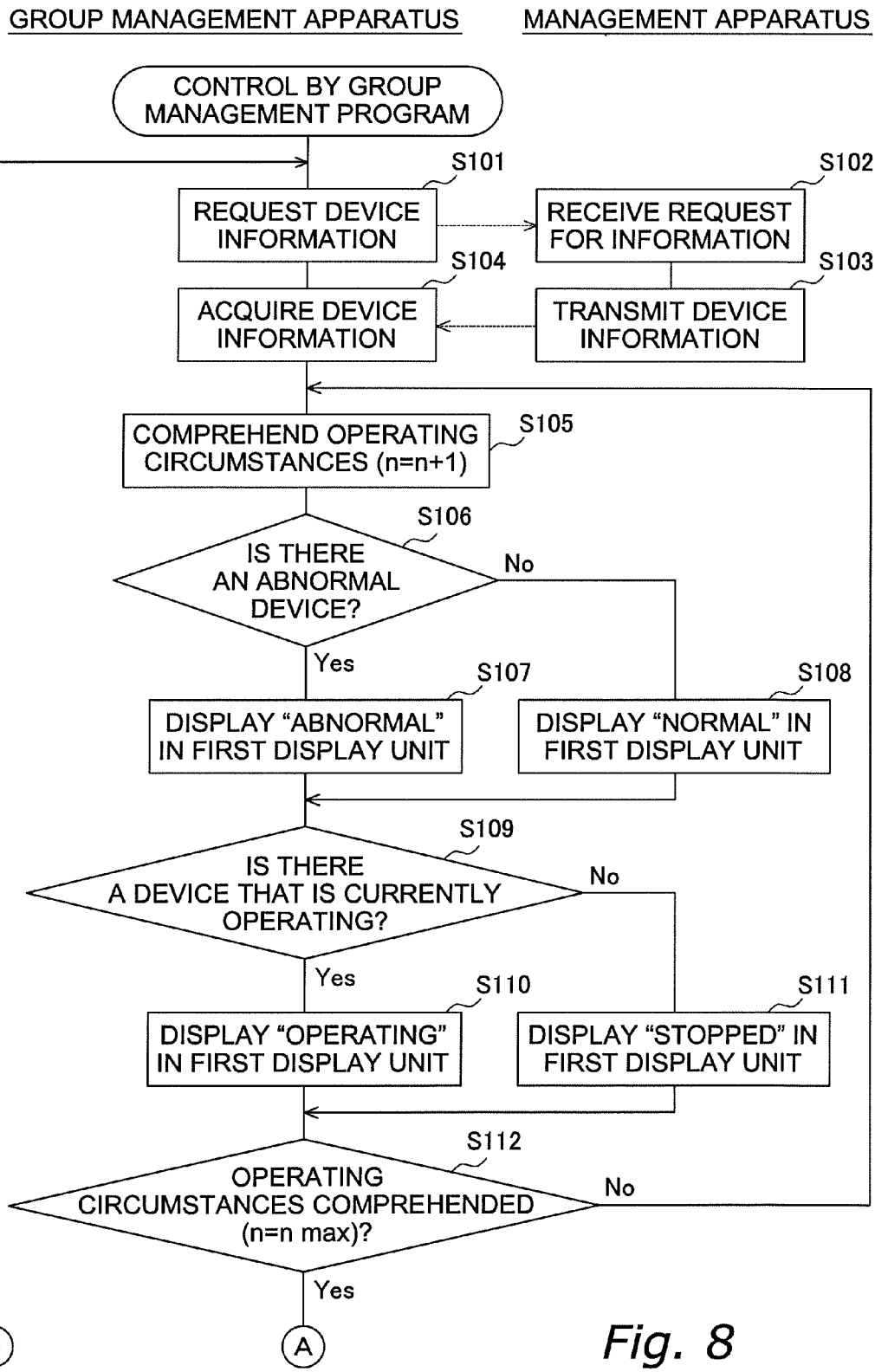
FIG. 8 is a diagram showing a flow of control by the group management program pertaining to an embodiment of the present invention.
Figure 9:
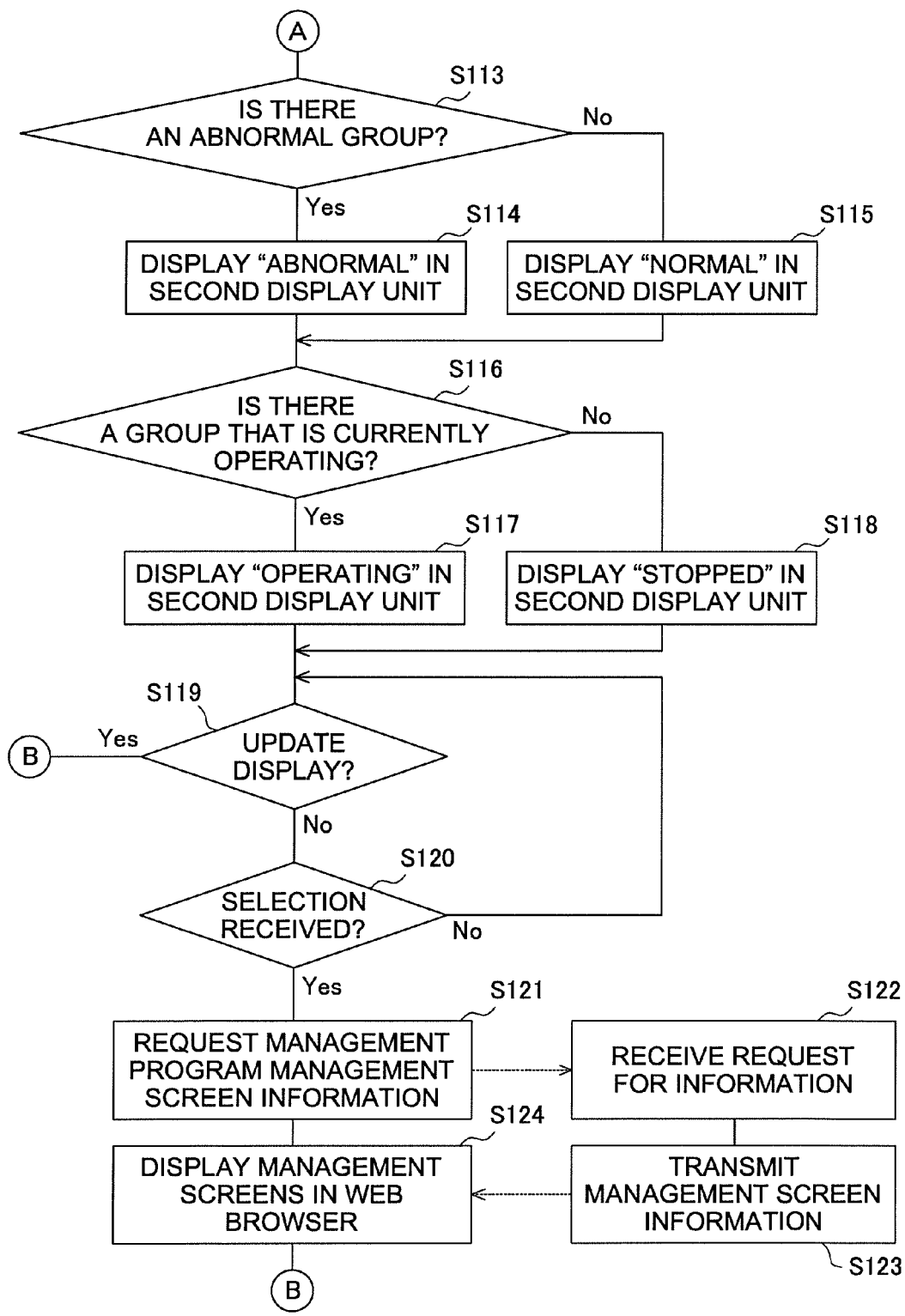
FIG. 9 is a diagram showing a flow of control by the group management program pertaining to an embodiment of the present invention.

Next, the flow of control by the group management program in the group management system 100 pertaining to the present embodiment will be described with reference to FIG. 8 and FIG. 9.

The group management apparatus 30 requests the device information with respect to the management apparatus 20*a*, 20*b*, etc. (step S101). When the management apparatus 20*a*, 20*b*, etc. receive the request for information from the group management apparatus 30 (step S102), the management apparatus 20*a*, 20*b*, etc. transmit the device information within the operating data memory regions 23*aa* to a group management apparatus 30 (step S103). When the group management apparatus 30 acquires the device information from the management apparatus 20*a*, 20*b*, etc. (step S104), the group management apparatus 30 starts comprehending the operating circumstances of the air conditioners 10*a*, 10*b*, etc. that belong to the air conditioner groups 15*a*, 15*b*, etc. on the basis of the device information that has been acquired (step S105). Here, the group management control unit 34 judges whether or not there are air conditioners 10*a*, 10*b*, etc. in which an abnormality is occurring among the air conditioner groups 15*a*, 15*b*, etc. (step S106). Where there is even one air conditioner in which an abnormality is occurring among the air conditioners 10*a*, 10*b*, etc., then the group management control unit 34 displays, in the first display unit 32*a*, "abnormal" for the operating circumstances of the air conditioner groups 15*a*, 15*b*, etc. to which the air conditioners 10*a*, 10*b*, etc. belong (step S107), and when there are no air conditioners 10*a*, 10*b*, etc. in which an abnormality is occurring, then the group management control unit 34 displays "normal" in the first display unit 32*a* (step S108). Moreover, the group management control unit 34 judges whether or not there are air conditioners 10*a*, 10*b*, etc. that are currently operating among the air conditioner groups 15*a*, 15*b*, etc. (step S109). When there is even one air conditioner that is currently operating among the air conditioners 10*a*, 10*b*, etc., then the group management control unit 34 displays, in the first display unit 32*a*, "operating" for the operating circumstances of the air conditioner groups 15*a*, 15*b*, etc. (step S110), and when all of the air conditioners 10*a*, 10*b*, etc. are currently stopped, then the group management control unit 34 displays "stopped" in the first display unit 32*a* (step S111). The group management control unit 34 repeats step S105 to step S111 until comprehension of the operating circumstances of all of the air conditioner groups 15*a*, 15*b*, etc. ends, and then proceeds to the next step S113 when comprehension of the operating circumstances ends in regard to all of the air conditioner groups 15*a*, 15*b*, etc. (step S112). In step S113, the group management control unit 34 judges whether or not there is "abnormal" in the operating circumstances of the air conditioner groups 15*a*, 15*b*, etc. Here, when there is even one air conditioner group judged to be abnormal among the air conditioner groups 15*a*, 15*b*, etc., then the group management control unit 34 displays "abnormal" in the second display unit (step S114). When any of the air conditioner groups 15*a*, 15*b*, etc. are not judged to be abnormal, then the group management control unit 34 displays "normal" in the second display unit (step S115). Further, the group management control unit 34 judges whether or not there is "operating" in the operating circumstances of the air conditioner groups 15*a*, 15*b*, etc. (step S116). When there is even one air conditioner group judged to be currently operating among the air conditioner groups 15*a*, 15*b*, etc., then the group management control unit 34 displays "operating" in the second display unit (step S117). When all of the air conditioner groups 15*a*, 15*b*, etc. are not judged to be operating, then the group management control unit 34 displays "stopped" in the second display unit (step S118).

It will be noted that the group management control unit 34 executes the processing of step 101 to step 118 periodically and/or each time the management screen of the group management program is operated, and updates the operating circumstances that are displayed in the first display unit 32*a* and the second display unit 32*b* (step S119).

Here, when the predetermined portions of the air conditioner groups 15*a*, 15*b*, etc. that are displayed in the first display unit 32*a* are selected (step S120), then the display control unit 34*a* of the group management apparatus 30 requests information relating to the management screens of the management programs with respect to the management apparatus 20*a*, 20*b*, etc. to which the air conditioner groups 15*a*, 15*b*, etc. are connected (step S121). When the management apparatus 20*a*, 20*b*, etc. receive the request for information (step S122), the management apparatus 20*a*, 20*b*, etc. transmit information relating to the management screens of the management programs to the group management apparatus 30 (step S123). It will be noted that, when the display control unit 34*a* requests information relating to the management screens of the management programs with respect to the management apparatus 20*a*, 20*b*, etc., when the management programs are not running in the management apparatus 20*a*, 20*b*, etc., then the display control unit 34*a* causes the management programs to be started up inside the management apparatus 20*a*, 20*b*, etc. and acquires information relating to the management screens of the management programs that have been started up. Thereafter, the display control unit 34*a* causes the management screens of the management programs to be displayed in the group management display unit 32 using a web browser (step S124).

<Characteristics>

(1) In a premises where plural buildings are dispersed and installed within one site and the plural air conditioners 10*a*, 10*b*, etc. are disposed in the respective buildings, the plural air conditioners 10*a*, 10*b*, etc. are divided into several groups and the management apparatus 20*a*, 20*b*, etc. are connected to each of the groups in order to efficiently manage the air conditioners 10*a*, 10*b*, etc., and the air conditioners 10*a*, 10*b*, etc. are managed. For that reason, when the number of the air conditioner groups 15a, 15b, etc. increases, the number of the management apparatus 20a, 20b, etc. that manage the groups also increases, and it is not easy simply to verify all of the management apparatus 20a, 20b, etc. By using the group management apparatus 30 pertaining to the present embodiment, all of the management apparatus 20a, 20b, etc. that have been installed in plural places in one premises can be managed in one place, so this is extremely useful in terms of managing the air conditioners 10a, 10b, etc. efficiently.

(2) In the group management system 100 pertaining to the present embodiment, a system manager can judge at a glance, via the plural management apparatus 20a, 20b, etc. that are installed in one premises, the operating circumstances (operating/abnormal) of the plural air conditioner groups 15a, 15b, etc. that are respectively connected to those management apparatus 20a, 20b, etc.; so, for example, in universities, hospitals or factories that are exemplified in the present embodiment, a situation is conceivable where, when the air conditioner groups 15a, 15b, etc. in an operating circumstance are discovered in the middle of the night even though all keys have been returned, the power of any of the air conditioners 10a, 10b, etc. that belong to the air conditioner groups 15a, 15b, etc. has been left ON as a result of forgetting to turn the power OFF. Even in such a case, a control command to stop operation of the air conditioners 10a, 10b, etc. that are currently operating can be performed with respect to the management apparatus 20a, 20b, etc. by performing collective stopping in the group management apparatus 30. Further, even during a power outage, an operation command can be transmitted via the management apparatus 20a, 20b, etc. with respect to all of the air conditioners 10a, 10b, etc. that have been installed in the premises by executing collective operation.

(3) Moreover, in the group management system 100 pertaining to the present embodiment, the management programs can be launched in the management apparatus 20a, 20b, etc. that correspond to the air conditioner groups 15a, 15b, etc. by selecting predetermined places of each of the air conditioner groups 15a, 15b, etc. in the display per group displayed on the first display unit 32a of the group management display unit 32. Further, because the screens of the management programs that have been launched can be displayed in the group management apparatus 30, details of the operating circumstances of all of the air conditioners 10a, 10b, etc. that have been installed in the premises can be verified in one place. That is, when the existence of air conditioners 10a, 10b, etc. that are currently operating or in which an abnormality has occurred in any of the air conditioner groups 15a, 15b, etc. has been able to be verified in the group management apparatus 30, then which of the air conditioners 10a, 10b, etc. of the air conditioner groups 15a, 15b, etc. is actually currently operating or in which an abnormality is occurring can be identified using the group management apparatus 30.

<Modifications>

(1) In the preceding embodiment, the air conditioners 10a, 10b, etc. that are management targets are not limited to being configured by the same type of the air conditioners 10a, 10b, etc. and may also be configured by plural types of the air conditioners 10a, 10b, etc.

Further, the equipment devices may also be equipment devices other than the air conditioners 10a, 10b, etc. For example, the equipment devices may also be power supply equipment, water supply and drainage apparatus, humidifiers, elevator machines, lighting apparatus, disaster prevention apparatus, security devices, or devices in which plural types of devices are combined.

(2) The management apparatus 20a, 20b, etc. and the group management apparatus 30 may also be interconnected by a line other than an intranet line. For example, they may also be interconnected by an internet line or a phone line.

(3) In the preceding embodiment, the operating circumstances of the air conditioner groups 15a, 15b, etc. displayed on the group management display unit 32 were judgment results in regard to predetermined conditions in regard to whether or not the plural air conditioners 10a, 10b, etc. that belong to the plural air conditioner groups 15a, 15b, etc. are currently operating and whether or not an abnormality has occurred, but other conditions desired by a user may also be displayed.

(4) In regard to the flow of control by the group management program that has been described in the preceding embodiment, judgment of the operating circumstances of the equipment devices 15a, 15b, etc. and of the operating circumstances of the entire system was performed in the order of whether or not an abnormality has occurred and whether or not the air conditioners are currently operating, but judgment of the operating circumstances is not limited to this order; whether or not an abnormality has occurred may also be judged after whether or not the air conditioners are currently operating has been judged.

INDUSTRIAL APPLICABILITY

The present invention enables collective management of plural air conditioner groups that are respectively connected to plural management apparatus and of plural air conditioners that belong to the air conditioner groups, and is useful as a group management system disposed with equipment devices, management apparatus and a group management apparatus.

What is claimed is:

1. A group management system comprising:
a first management apparatus configured to be connected to a first equipment device group including a plurality of first equipment devices, the first management apparatus being configured to centrally manage the first equipment devices of the first equipment device group;
a second management apparatus configured to be connected to a second equipment device group including a plurality of second equipment devices separate from the plurality of first equipment devices, the second management apparatus being configured to centrally manage the second equipment devices of the second equipment device group; and
a group management apparatus connected to the first and second management apparatuses, the group management apparatus being configured to centrally manage the first and second equipment device groups,
the first management apparatus including a first management program configured to centrally manage the first equipment devices of the first equipment device group, the first management program being configured to cause a first controlling screen to be displayed, the first controlling screen being used to receive control information for the first equipment device,
the second management apparatus including a second management program configured to centrally manage the second equipment devices of the second equipment device group, the second management program being configured to cause a second controlling screen to be displayed, the second controlling screen being used to receive control information for the second equipment device, the group management apparatus including
- a group management memory unit configured to store a group management program configured to centrally manage the first and second equipment device groups, the group management program being configured to display group management results in a group management screen, the group management results including a managing result of the first equipment devices group and a managing result of the second equipment devices group,
- a group management control unit configured to execute the group management program and to determine a group operating circumstance for the each of the first and second equipment device groups, and
- a first display unit included in the group management screen and configured to display a list of group operating circumstances of the first and second equipment device groups that have been determined by the group management control unit, the list of group operating circumstances including a region corresponding to the groups and a region corresponding to the group operating circumstances, and the first display unit being configured to selectably display in a display region predetermined portions including at least one of the region corresponding to the groups and the region corresponding to the group operating circumstances, and
- a second display unit included in the group management screen and configured to display one operating circumstance for all the group operating circumstances collectively managed.

2. The group management system of claim 1, wherein the group management apparatus further includes a display control unit configured to display at least one of
- the first controlling screen in the group management apparatus, the first controlling screen being displayed in the first management apparatus which is connected to the first equipment device group corresponding to a selected one of the predetermined portions, and
- the second controlling screen in the group management apparatus, the second controlling screen being displayed in the second management apparatus which is connected to the second equipment device group corresponding to another selected one of the predetermined portions when the group management apparatus receives any selections by the predetermined portions.

3. The group management system of claim 1, wherein the group management apparatus further includes
- a group management control unit configured to execute the group management program and to comprehend operating circumstances of the first and second equipment device groups, and
- a first display unit configured to display the operating circumstances of the first and second equipment device groups that have been comprehended by the group management control unit.

4. The group management system of claim 1, wherein the group management apparatus further includes a first display unit configured to selectively display predetermined portions relating to the first and second equipment device groups, the predetermined portions being displayed per equipment device group, and the group management apparatus further includes a display control unit configured to cause management screens of the first and second management programs that correspond to the predetermined portions to be displayed on the first display unit when the group management apparatus receives selections from the predetermined portions.

5. The group management system of claim 4, wherein the display control unit is further configured to cause the management screens of the first and second management programs to be displayed in the first display unit using a web browser, the first and second management programs having been started in the management apparatus.

6. The group management system of claim 3, wherein the first display unit is further configured to selectively display predetermined portions relating to the first and second equipment device groups, the predetermined portions being displayed per equipment device group, and the group management apparatus further includes a display control unit configured to cause management screens of the first and second management programs that correspond to the predetermined portions to be displayed on the first display unit when the group management apparatus receives selections from the predetermined portions.

7. The group management system of claim 6, wherein the display control unit is further configured to cause the management screens of the first and second management programs to be displayed in the first display unit using a web browser, the first and second management programs having been started in the management apparatus.

8. A group management apparatus configured to be connected to
- a first management apparatus connected to a first equipment device group including a plural equipment devices, the first management apparatus centrally managing the first equipment devices of the first equipment device group using a first management program thereof, the first management program being configured to cause a first controlling screen to be displayed, the first controlling screen being used to receive control information for the first equipment device, and
- a second management apparatus connected to a second equipment device group including a plurality of second equipment devices separate from the plurality of first equipment devices, the second management apparatus centrally managing the second equipment devices of the second equipment device group using a second management program thereof, the second management program being configured to cause a second controlling screen to be displayed, the second controlling screen being used to receive control information for the second equipment device, the group management apparatus being configured to centrally manage the first and second equipment device groups, the group management apparatus comprising:
- a group management memory unit configured to store a group management program that is different from the first and second management programs, the group management program being used to centrally manage the first and second equipment device groups, the group management program being configured to display group management results in a group management screen, the group management results including a managing result of the first equipment devices group and a managing result of the second equipment devices group;

a group management control unit configured to execute the group management program to centrally manage the first and second equipment device groups and to determine a group operating circumstance for the each of the first and second equipment device groups;

a first display unit included in the group management screen and configured to display a list of group operating circumstances of the first and second equipment device groups that have been determined by the group management control unit, the list of group operating circumstances including a region corresponding to the groups and a region corresponding to the group operating circumstances, and the first display unit being configured to selectably display in a display region predetermined portions including at least one of the region corresponding to the groups and the region corresponding to the group operating circumstances, and a second display unit included in the group management screen and configured to display one operating circumstance for all the group operating circumstances collectively managed.

9. The group management apparatus of claim 8, further comprising a display control unit configured to display at least one of the first controlling screen in the group management apparatus, the first controlling screen being displayed in the first management apparatus which is connected to the first equipment device group corresponding to a selected one of the predetermined portions, and the second controlling screen in the group management apparatus, the second controlling screen being displayed in the second management apparatus which is connected to the second equipment device group corresponding to another selected one of the predetermined portions when the group management apparatus receives any selections by the predetermined portions.

10. The group management apparatus of claim 8, wherein the group management control unit is further configured to execute the group management program and to comprehend operating circumstances of the first and second equipment device groups, and the group management apparatus further includes a first display unit configured to display the operating circumstances of the first and second equipment device groups that have been comprehended by the group management control unit per equipment device group.

11. The group management apparatus of claim 8, wherein the group management apparatus further includes a first display unit configured to selectively display predetermined portions relating to the first and second equipment device groups, the predetermined portions being displayed per equipment device group, and the group management apparatus further includes a display control unit configured to cause management screens of the first and second management programs that correspond to the predetermined portions to be displayed on the first display unit when the group management apparatus receives selections from the predetermined portions.

12. The group management system of claim 11, wherein the display control unit is further configured to cause the management screens of the first and second management programs to be displayed in the first display unit using a web browser.

13. The group management apparatus of claim 10, wherein the first display unit is further configured to selectively display predetermined portions relating to the first and second equipment device groups, the predetermined portions being displayed per equipment device group, and the group management apparatus further includes a display control unit configured to cause management screens of the first and second management programs that correspond to the predetermined portions to be displayed on the first display unit when the group management apparatus receives selections from the predetermined portions.

14. The group management system of claim 13, wherein the display control unit is further configured to cause the management screens of the first and second management programs to be displayed in the first display unit using a web browser.

* * * * *